(12) United States Patent
Kuo

(10) Patent No.: US 6,782,545 B2
(45) Date of Patent: Aug. 24, 2004

(54) DISK-POSITIONING DEVICE FOR SLOT-IN OPTICAL DISK DRIVE

(75) Inventor: Tsung-Jung Kuo, Taipei (TW)

(73) Assignee: Lite-On It Corporation, Taipei (TW)

( * ) Notice: Subject to any disclaimer, the term of this patent is extended or adjusted under 35 U.S.C. 154(b) by 162 days.

(21) Appl. No.: 10/290,891

(22) Filed: Nov. 8, 2002

(65) Prior Publication Data

US 2003/0090983 A1 May 15, 2003

(30) Foreign Application Priority Data

Nov. 9, 2001 (TW) ...................................... 90219324 U

(51) Int. Cl.⁷ .......................... G11B 17/04; G11B 33/02
(52) U.S. Cl. .................................. 720/620; 369/77.11
(58) Field of Search ..................... 720/620; 369/77.11, 369/77.21, 75.11, 75.21, 77.1, 77.2, 75.1, 75.2

(56) References Cited

U.S. PATENT DOCUMENTS 6,222,811 B1 * 4/2001 Sakurai et al.
6,256,280 B1 * 7/2001 Sakurai et al.
6,512,730 B1 * 1/2003 Lee et al.
2002/0159373 A1 * 10/2002 Saji et al.
2003/0099182 A1 * 5/2003 Maeda et al.

* cited by examiner

Primary Examiner—Allen Cao
(74) Attorney, Agent, or Firm—Thomas, Kayden, Horstemeyer & Risley

(57) ABSTRACT

A disk-positioning device for a slot-in optical disk drive. The device can identify the size of the optical disk inserted in the slot-in optical disk drive. The disk-positioning device includes a substrate, a positioning rod, a locking rod, a floating lever, and a sliding plate. The positioning rod is linearly movable on the substrate, and the locking rod is slidably connected to an end of the positioning rod, providing the positioning rod with a location in which to position the optical disk. The floating lever is slidably connected to the other end of the positioning rod. The sliding plate activates a disk-fixing device to fix the optical disk to a spindle of the drive.

13 Claims, 6 Drawing Sheets

DISK-POSITIONING DEVICE FOR SLOT-IN OPTICAL DISK DRIVE

BACKGROUND OF THE INVENTION

1. Field of the Invention

The present invention relates to a disk-positioning device, and particularly to a disk-positioning device use in a slot-in optical disk drive that can receive and position disks of different sizes.

2. Description of the Prior Art

Conventional optical disks have all been provided in a standard 12 cm diameter ("12 cm disk"), but recent developments have led to the use of smaller 8 cm diameter ("8 cm disk").

In order to use disks of both sizes in a conventional optical disk, it is necessary to make sure that the optical disks are placed on a turntable in a smooth operation after loading the optical disk. However, while in use, it is impossible for the conventional optical disk drive to know which type of disk user is loading. Therefore, the conventional optical disk drive uses its positioning basis of the standard 12 cm disk. As a result, it may be difficult to properly position the optical disk when 8 cm disk is inserted. Even worse, it may lead to read failure when the conventional disk drive attempts to read an 8 cm disk.

However, a disadvantage of the loading mechanism of the conventional optical disk drive is that the structures of fitting mechanisms are complex and their parts are great in number because mechanism uses angle-dependent linkage device. Thus, there remains a need for an optical disk drive that can receive and read both 8 cm disks and 12 cm disks.

SUMMARY OF THE INVENTION

It is an object of the present invention to provide an optical disk drive that can receive and read both 8 cm disks and 12 cm disks.

It is another object of the present invention to provide an optical disk drive that can identify the size of the disks being inserted.

In order to accomplish the object of the present invention, the present invention provides a disk positioning device. The disk-positioning device has a locking rod having one pin and two locking notches, a floating lever having a guide pin and a positioning rod having a locking pin and holding pin. When a disk having a first size is inserted and contacts the pin of the locking rod, the locking rod disengages from the positioning rod. When a disk having a second size is inserted, the locking rod maintains its lock with the positioning rod.

DESCRIPTION OF THE DRAWINGS

The present invention can be fully understood from the following detailed description and preferred embodiment with reference to the accompanying drawings in which.

DETAILED DESCRIPTION OF THE INVENTION

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Although the embodiments of the present invention are described below in connection with a slot-in disk drive, the present invention can be applied to all optical disk drive, including but not limited to DVD drives, COMBO drives, car audio drives, etc.

Figure 1:
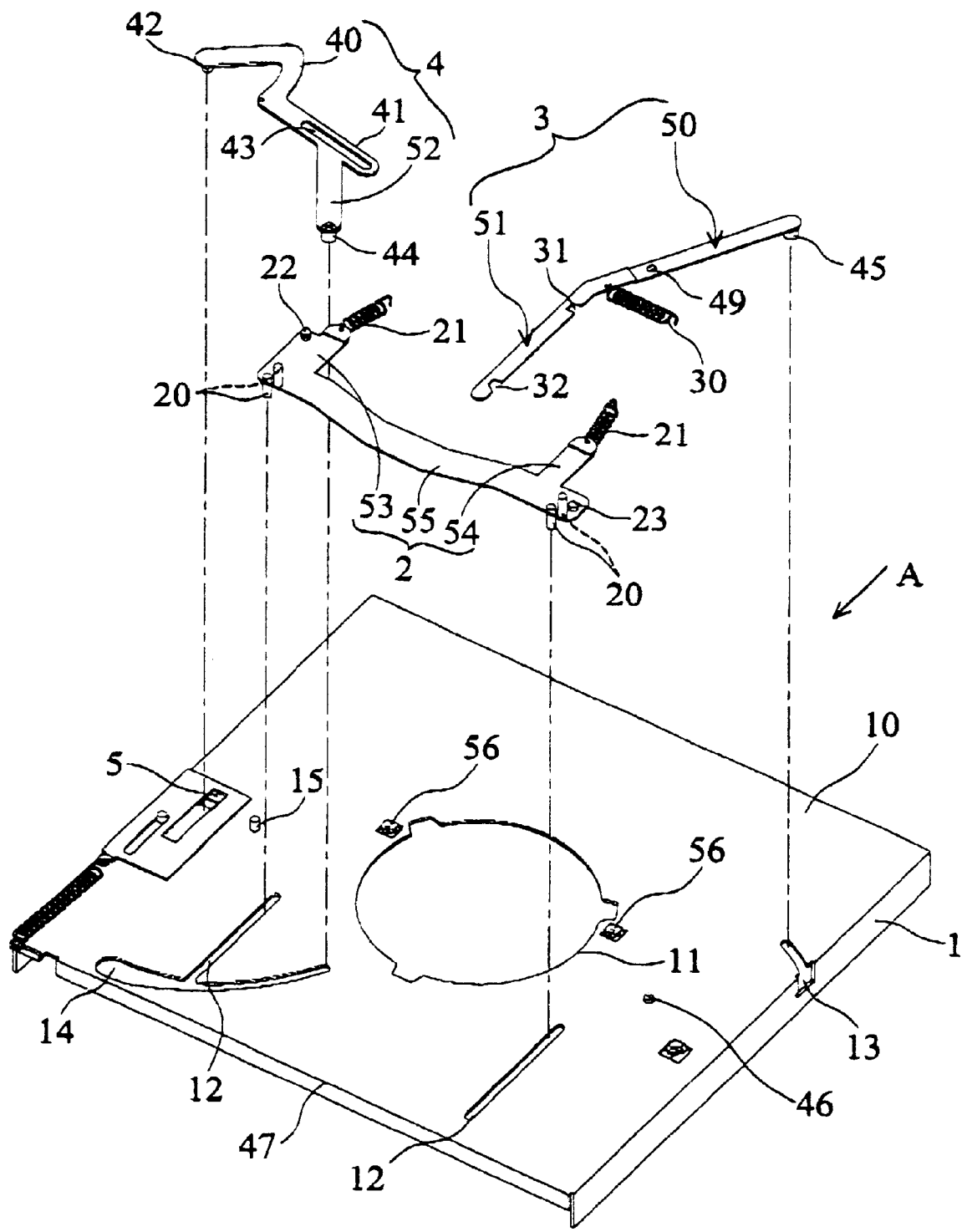
FIG. 1 is an exploded view of a disk-positioning device in accordance with the present invention.
Figure 2:
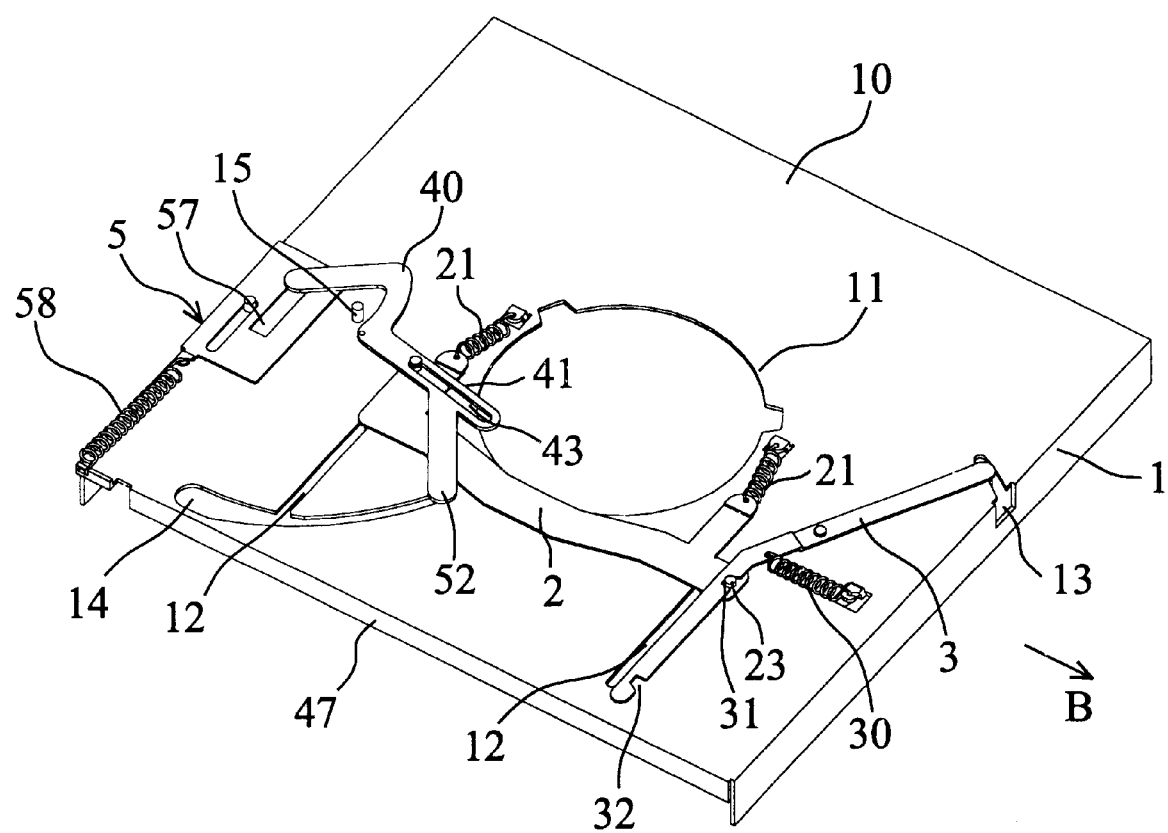
FIG. 2 shows the perspective view of the disk-positioning device of FIG. 1.
Figure 3:
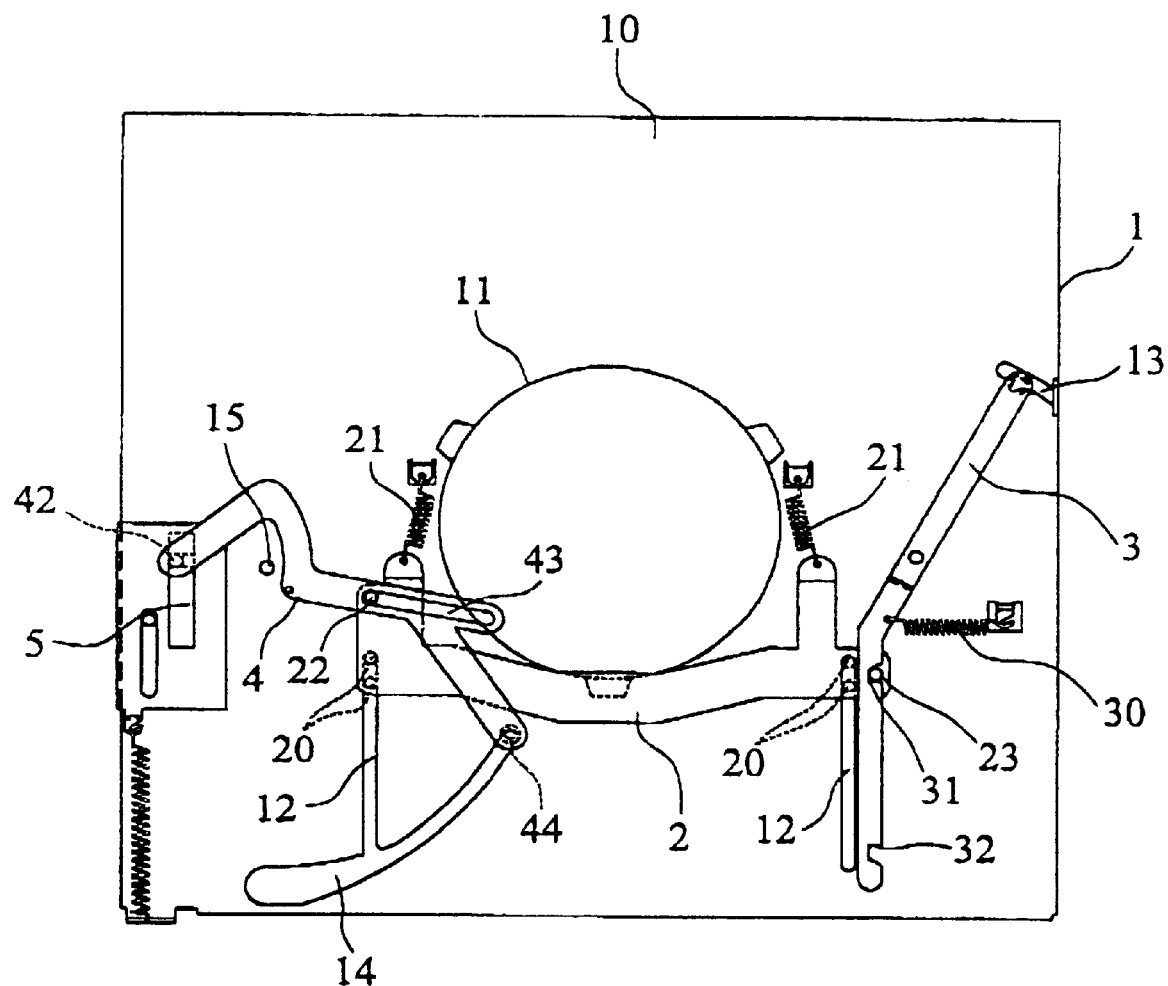
FIG. 3 is a plan view of the disk-positioning device of FIG. 1, without any optical disk disposed therein.

Referring to FIGS. 1 and 2, a disk-positioning device of the present invention for a slot-in disk drive comprises a substrate 1, a positioning rod 2, a locking rod 3, a floating lever 4, and a sliding plate 5. FIGS. 1–3 best illustrates the interconnection of the various components of the disk-positioning device with respect to substrate 1.

The substrate 1 is the framework of the disk-positioning device for fixing the above-mentioned elements 2, 3, 4, 5 and receiving optical disks (e.g. CDs). The optical disks are inserted in the direction of arrow A in FIG. 1. As best shown in FIGS. 1–3, the substrate 1 has an entrance port 10 at the front. Furthermore, the substrate 1 defines a central through hole 11 of a disk-fixing device (not shown), which fixes the optical disk to the spindle (not shown) of the optical disk drive. The substrate 1 further includes two guiding grooves 12 and a curved guiding groove 14, all positioned near the rear edge 47. The substrate 1 also has a guiding groove 13 positioning at its right side. Two guiding grooves 12 are substantially parallel to the direction in which an optical disk is inserted (arrow A).

A pivot pin 46 is positioned between the central through hole 11 and the right side of the substrate 1. The pivot pin 46 pivotally couples a hole 49 that is provided at the first segment 50 of the locking rod 3. A first notch 31 and a second notch 32 are positioned near the opposing ends of the second segment 51 of the locking rod 3, respectively. The first segment 50 of the locking rod 3 has a guiding pin 45 positioned on the bottom surface of the locking rod 3. The guiding pin 45 is adapted to extend through and travel within the guiding groove 13. An elastic member 30 functions to pull the locking rod 3 outwardly in the direction of arrow B in FIG. 2.

The positioning rod 2 is a generally U-shaped component and has a right extension 54, a left extension 53 and a straight section 55. Each of the opposing ends of the positioning rod 2 has two guiding pins 20 positioned on its bottom surface, and two guiding pins 20 are received in and travel along the corresponding guiding groove 12. Two elastic members 21 are connected to two hooks 56 and the extensions 53 and 54 to overcome elastic force during loading and unloading procedure. The positioning rod 2 also has a locking pin 23 positioned at its end near the right extension 54 and on its top surface. Besides, the locking pin 23 is adapted to releasably engage with the first notch 31 or the second notch 32 of the locking rod 3.

The floating lever 4 has a substantially V-shaped section 40, a straight section 41 and an extension 52. The extension 52 has a guiding pin 44 positioned on its bottom surface, and the guiding pin 44 is adapted to extend through and travel within the curved guiding groove 14. A holding groove 43 is provided at the straight section 41, and a holding pin 22 of the positioning rod 2 is positioned at the left extension 53 and adapted to extend through the holding groove 43. The V-shaped section 40 carries a guiding pin 42 that is positioned on its bottom surface, and the guiding pin 42 extends through and travels within an elongated hole 57 of the sliding plate 5.

As mentioned above, the guiding pin 42 of the floating lever 4 operatively couples the sliding plate 5. Besides, one end of an elastic member 58 is connected to the sliding plate 5 and the other end is secured to the substrate 1. Thus, the sliding plate 5 moves smoothly and linearly during insertion. Besides, a roller mechanism (not shown) of the entrance port 10 will pull in and pull out the optical disk during the insertion and ejection, respectively.

Figure 4:
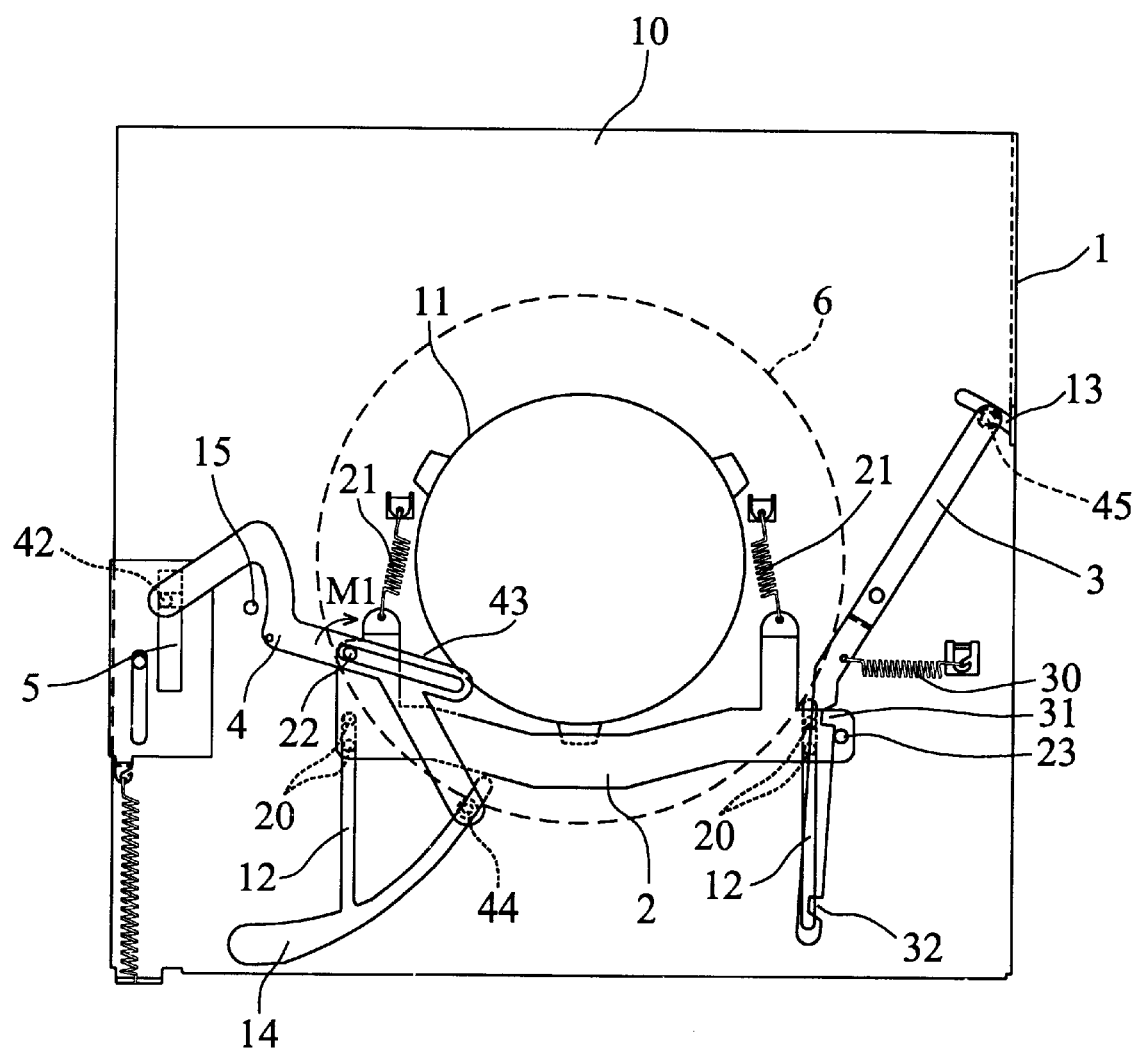
FIG. 4 illustrates how an 8-cm optical disk can be inserted into the disk-positioning device of FIG. 1.

FIG. 4 illustrates how an 8 cm disk 6 can be positioned inside the optical disk drive. When the 8 cm disk 6 is inserted into the optical disk drive, the 8 cm disk 6 will not contact the guiding pin 45 and will not push the locking rod 3. Thus, the positioning rod 2 and locking rod 3 remain engaged because the locking pin 23 of positioning rod 2 will remain engaged with the first notch 31. Besides, when the 8 cm disk 6 is pulled by the roller mechanism (not shown) of the entrance port 10 during the insertion, the 8 cm disk 6 will contact the guiding pin 44 and push the guiding pin 44 rearwardly for a short distance along the curved guiding groove 14. Then, a force is applied to the guiding pin 44 that produces a clockwise moment M1 about the holding pin 22. The floating lever 4 is pivoted about the holding pin 22 by the moment M1, thereby causing the guiding pin 42 and the sliding plate 5 to move forwardly. As the 8 cm disk 6 is inserted further, the 8 cm disk contact the four guiding pins 20 of the positioning rod 2 and the elastic member 58 is elongated to overcome the forward motion of the sliding plate 5. Meanwhile, the four guiding pins 20 function to guide the positioning of the 8 cm disk during the insertion. Then, the disk-fixing device (not shown) is activated by the forward motion of the sliding plate 5 to fix the optical disk to the spindle (not shown) of the optical disk drive.

To unload the 8 cm disk 6, the 8 cm disk 6 is pulled by the roller mechanism (not shown) of entrance port 10 and the sliding plate 5 will be pulled rearwardly by the elastic member 58, thereby causing the floating lever 4 to pivot counterclockwise. The positioning rod 2 will travel forwardly along the guiding grooves 12 until the guiding pins 20 reach the front end of the guiding grooves 12. Finally, the 8 cm disk 6 leaves the optical disk drive and the positioning rod 2 and the locking rod 3 remain engaged during the insertion and ejection.

Figure 5:
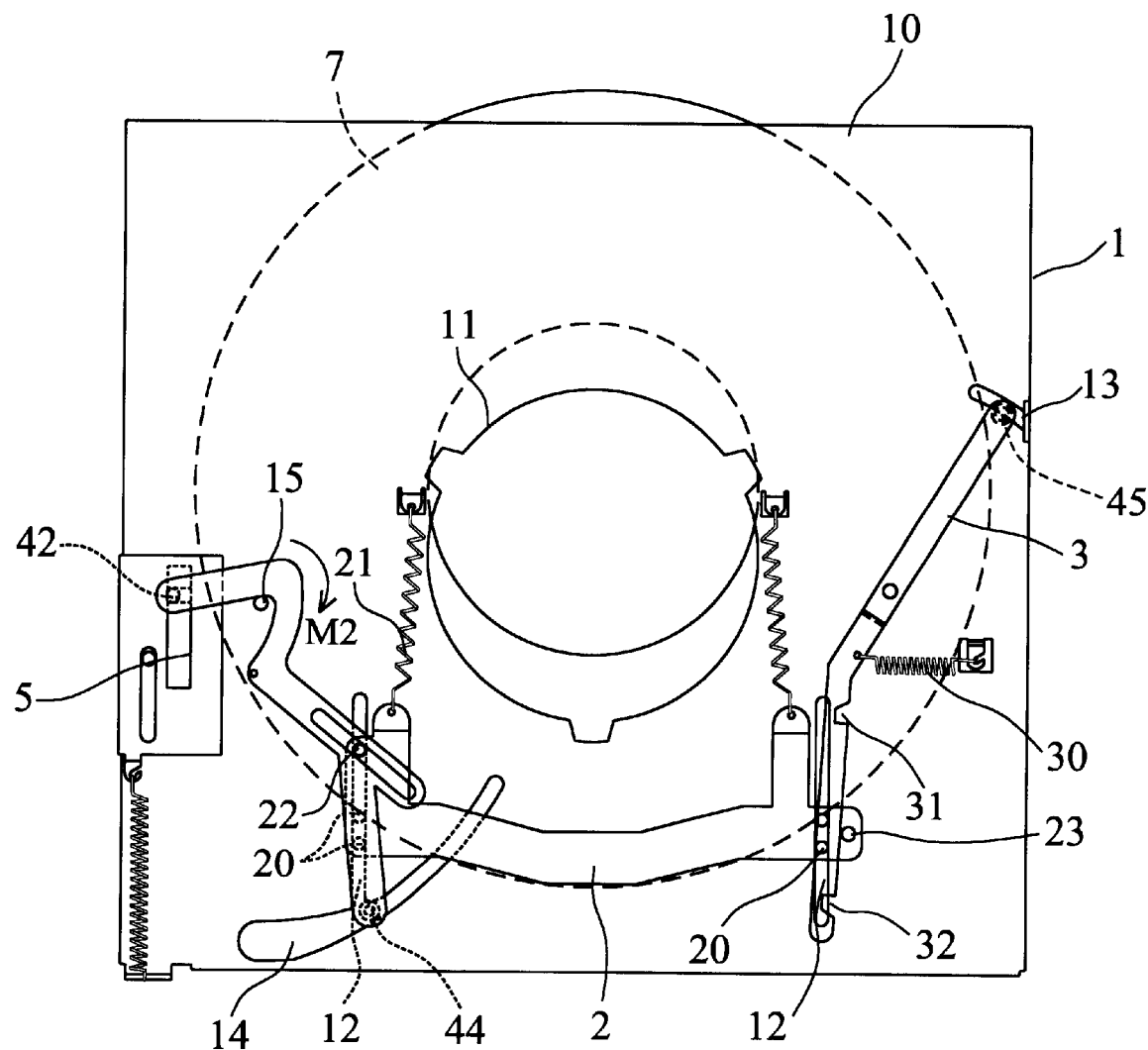
FIGS. 5–6 illustrates how a 12-cm optical disk can be inserted into the disk-positioning device of FIG. 1.
Figure 6:
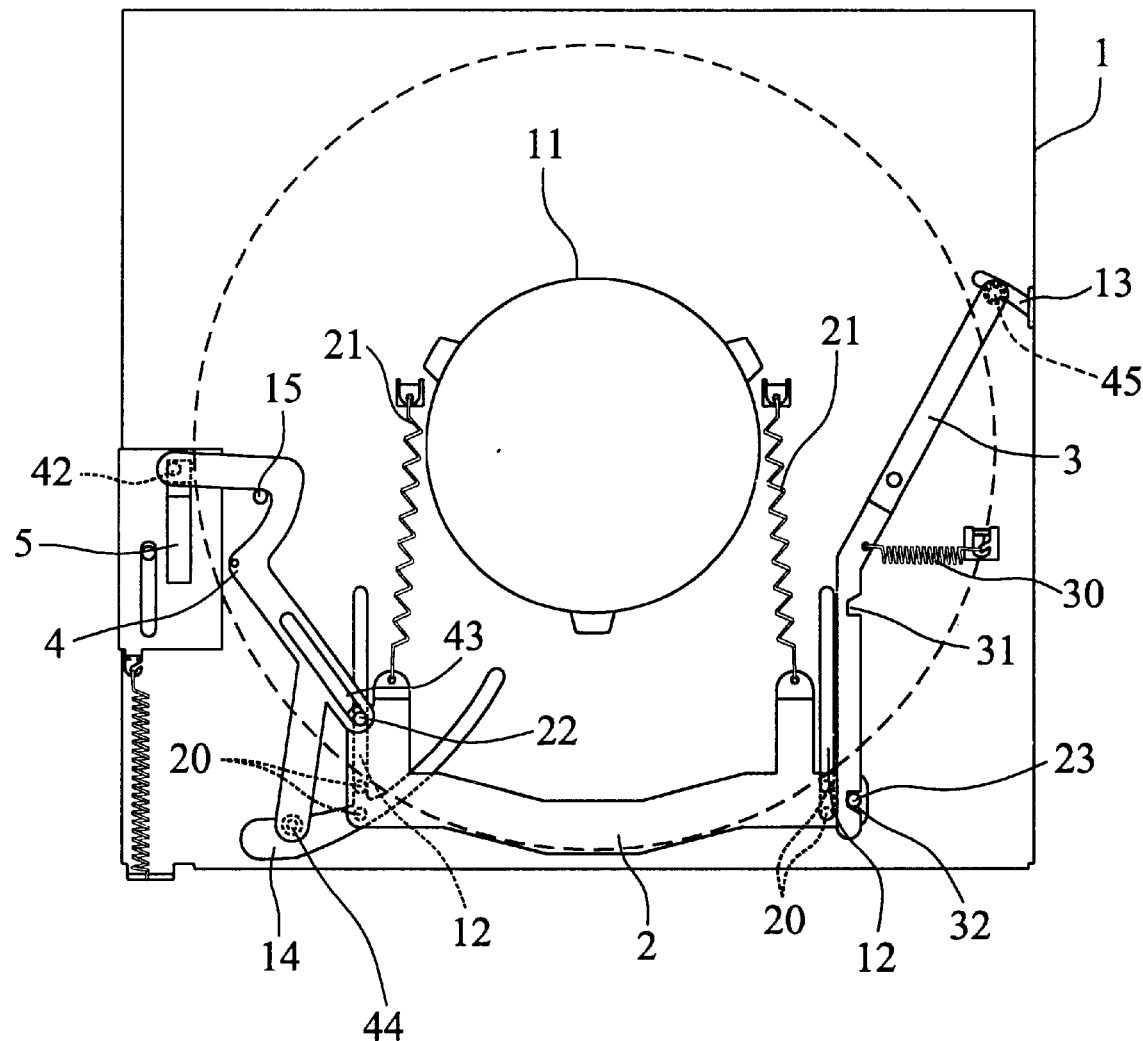

FIGS. 5 and 6 illustrate how a 12 cm disk 7 can be positioned inside the optical disk. When the 12 cm disk 7 is inserted through the entrance port 10 of the substrate 1, the 12 cm disk 7 will contact the guiding pin 45 and pull the locking rod 3 outwardly in the direction of arrow B in FIG. 5. The locking pin 23 of the positioning rod 2 disengages from the first notch 31 of the locking rod 3. Because of the resilient force of the elastic member 30, the locking pin 23 will abut and slide along the edge of the locking rod 3. Then, the 12 cm disk 7 will contact the guiding pin 44 and push the guiding pin 44 rearwardly along the curved guiding groove 14. Meanwhile, the guiding pin 44 continues to move along the curved guiding groove 14 until the V-shaped section 40 contacts a pivot pin 15 that is positioned near the sliding plate 5. The floating lever 4 is pivoted about the pivot pin 15 by a moment M2 that pulls the sliding plate 5 forwardly and cause the elastic member 58 elongated to overcome the moment M2.

Referring to FIG. 6, as the 12 cm disk 7 is inserted further, the 12 cm disk 7 will contact the four guiding pins 20 and push the positioning rod 2 rearwardly until the locking pin 23 becomes engaged with the second notch 32 of the locking rod 3. Thus, the 12 cm disk 7 is firmly seated in the optical disk drive and the sliding plate 5 comes to stop. Then, the disk-fixing device (not shown) is activated by the sliding plate 5 to fix the optical disk to the spindle (not shown) of the optical disk drive.

To eject the 12-cm optical disk 7, the ejection of the 12 cm disk 7 is the same as for the 8 cm disk 6 as described above. In particular, the positioning rod 2, the floating lever 4 and the sliding plate 5 will be activated to move in a reverse motion. Thus, the locking pin 23 of the positioning rod 2 disengages from the second notch 32, abuts and slides along the edge of the locking rod 3. Finally, the locking pin 23 becomes engaged with the first notch 31 again, and the positioning rod 2 and the locking rod 3 remain locked. The disk-positioning device then restores to its original state as shown in FIG. 3. The user can load another optical disk.

In conclusion, the present invention utilizes a linearly movable positioning rod 2 to guide the positioning of both a 12 cm disk and an 8 cm disk into the optical disk drive. The present invention also can identify the size of the inserted optical disk regardless of the 8 cm disk or 12 cm disk.

While the invention has been described with reference to preferred embodiments, the detailed description is not intended to be construed in a limiting sense. It is therefore contemplated that the appended claims will cover any such modifications or embodiments as may fall within the scope of the invention defined by the following claims and their equivalents.

What is claimed is:

1. A disk-positioning device for a slot-in optical disk drive, comprising:
   a substrate;
   a locking rod having a first notch and a second notch;
   a positioning rod having one locking pin and one holding pin, the locking pin of the positioning rod being adapted to releasably engage with the locking notches of the locking rod;
   a floating lever having a holding groove and a guiding pin, the guiding pin of the positioning rod being adapted to extend through and travel within the holding groove;
   a sliding plate having a elongated hole, the guiding pin of the floating lever adapted to extend in the elongated hole and the floating lever operatively coupled the sliding plate; and
   wherein the locking rod, the positioning rod, the floating lever and the sliding plate operatively interconnect above the substrate.

2. The disk-positioning device as claimed in claim 1, wherein the substrate includes an entrance port for receiving an optical disk.

3. The disk-positioning device as claimed in claim 1, wherein the substrate is provided with at least one guiding groove substantially parallel to a direction in which the optical disk is inserted, the positioning rod having at least one guiding pin that is received in and travel along the corresponding guiding groove.

4. The disk-positioning device as claimed in claim 1, wherein the substrate is provided with a curved guiding groove and the guiding pin of the floating lever is adapted to extend through and travel within the curved guiding groove.

5. The disk-positioning device as claimed claim 1, wherein the locking pin of the positioning rod will remain engaged when a disk having the first size is inserted.

6. The disk-positioning device as claimed in claim 1, wherein the locking pin of the positioning rod disengages from the first notch and engages the second notch when a disk having the bigger second size is inserted.

7. The disk-positioning device as claimed claim 1, wherein the floating lever is pivoted above the holding pin of the positioning rod by a moment when a disk having the first size is inserted.

8. The disk-positioning device as claimed in claim 1, wherein the substrate has a pivot pin and the floating lever is pivoted above the pivot pin by another moment when a disk having the bigger second size is inserted.

9. The disk-positioning device as claimed in claim 1, further comprising an elastic element connecting the positioning rod and the substrate to bias the positioning rod when the disk is inserted.

10. The disk-positioning device as claimed in claim 9, wherein the elastic element is a tension spring.

11. The disk-positioning device as claimed in claim 1, further comprising an elastic element connecting the locking rod functioning to pull the locking rod outwardly.

12. The disk-positioning device as claimed in claim 11, wherein the elastic element is a tension spring.

13. A disk-positioning device for a slot-in optical disk drive, comprising:

a substrate;

a locking rod having a first notch and a second notch;

a positioning rod having one locking pin, one holding pin and at least two guiding pins, the locking pin of the positioning rod being adapted to releasably engage with the locking notches of the locking rod;

a floating lever having a holding groove and two guiding pin, the holding pin of the positioning rod being adapted to extend through and travel within the holding groove;

a sliding plate having a elongated hole, the guiding pin of the floating lever adapted to extend in the elongated hole and the floating lever operatively coupled the sliding plate;

at least two guiding grooves provided on the substrate, the two guiding pins of the positioning pins adapted to extend through and travel within the two guiding groves;

a curved guiding groove provided on the substrate, the guiding pin of the floating lever adapted to extend through the curved guiding groove;

wherein the locking rod, the positioning rod, the floating lever and the sliding plate operatively interconnect above the substrate.

\* \* \* \* \*